Patented Apr. 26, 1949

2,468,594

UNITED STATES PATENT OFFICE 2,468,594

THERMOPLASTIC CEMENT

George F. Dustin and Robert B. Manning, Westfield, N. J., assignors to Western Electric Company, Incorporated, New York, N. Y., a corporation of New York No Drawing. Application July 17, 1946,
Serial No. 684,257

3 Claims. (Cl. 260—31.2)

This invention relates to a cement and more particularly to a thermoplastic cement hard and rigid at ordinary temperatures but softenable by heat.

A great variety of electrical apparatus was developed and manufactured for the armed forces during the last few years. In some instances it was necessary to cement elements of such apparatus in position in such fashion as to hold the elements rigidly and securely in place under conditions where they might be subjected to severe shock or heavy vibration and often also to wide ranges of atmospheric temperatures, temperatures such as −40° F. or even −60° F. in polar winter circumstances and temperatures up to or even above 150° F. in tropical countries in summer. At the same time it was eminently desirable, in some cases, that the cemented element be removable for interchange when tests of the completed apparatus after assembly indicated that such alteration was necessary.

An object of the present invention is to provide a cement melting or softening to adhesive manipulability at from 200° F. to 300° F., which is hard and substantially without flow at temperatures from 150° F. or 180° F. down, and which is thermoplastic, not thermosetting, in nature, i. e., which can be resoftened after hardening by heating to approximately its original softening temperature.

With the above and other objects in view the invention may be illustratively embodied in a composition of matter for use as a cement and consisting of a suitable volatile liquid vehicle in which is dissolved or dispersed such proportions of vinyl acetate polymer, semi-cured phenol-formaldehyde resin, and mineral or other inert flour as will give the desired consistency and critical temperatures.

Other objects and features of the invention will appear from the following detailed description of an embodiment thereof in a composition of matter for use as a cement particularly useful where extremes of temperature are to be met as well as mechanical disturbances, e. g., shock or vibration.

In a preferred embodiment the invention is a composition of matter consisting of

| | Parts by weight |
|---|---|
| Methyl acetate (solvent) | 43.0 |
| Vinyl acetate polymer | 16.8 |
| Phenol-formaldehyde resin | 1.2 |
| Mica flour | 39.0 |

In this preferred form, the vinyl acetate polymer is preferably one hydrolyzed to have an acetate group content of about 14%. Such polymers are described in U. S. Patent 2,398,344 granted April 16, 1946 to H. M. Collins et al., and so need not be further particularized here as to origin or method of manufacture.

It is felt that the immediately above tabulated proportions are the optimum to meet the severe requirements described in the introduction above. However, it appears that proportions within the ranges tabulated immediately hereafter will in general meet requirements of similar stringency, namely,

| | Parts by weight |
|---|---|
| Methyl acetate (solvent) | 42 to 44 |
| Vinyl acetate polymer, hydrolyzed to 13%–15% acetate group content | 16 to 18 |
| Phenol-formaldehyde resin | 1.0 to 1.4 |
| Mica flour | 25 to 45 |

The phenol-formaldehyde resin is the well-known liquid or pasty intermediate condensation substance, which when fully condensed, is a familiar thermoset commercial resin, this intermediate product being a familiar article of commerce.

When the methyl acetate solvent of the above mixture has been driven off by evaporation, preferably with heat, there remains a solid cement which has a softening or incipient melting point at about 260° F. The material remains substantially flowlessly solid up to temperatures not accurately determined but well over 200° F. and thus well above any temperature to be reasonably encountered as an ambient atmospheric temperature. This is because of the small proportion of thermosetting resin included in the composition as an ingredient. Without this ingredient, the composition will sometimes begin to flow under pressure at about 150° F. or even below. Although the phenol-formaldehyde is a thermosetting resin, it is found that the thermoplastic character of the compound as a whole is not altered by the inclusion of this thermosetting ingredient in the given proportion, which merely raises and, apparently, sharpens the softening or melting point.

While the above narrowly and specifically defined compositions are believed to be preferable, it is found that compositions within the following ranges are of softening temperatures ranging from 180° F. to 300° F., thermoplastic in general character, as they can be resoftened after having once been set, and this repeatedly, by heating to about the same temperature each time:

| | Parts by weight |
|---|---|
| Methyl acetate (solvent) | 38 to 50 |
| Vinyl acetate polymer | 12 to 19 |
| Phenol-formaldehyde resin | 0.2 to 2.0 |
| Mica flour | 25 to 45 |

In these compositions the hydrolyzation of the vinyl acetate may be within the range such that the acetate group content is from 12% to 18%. The proportion of mica flour may vary within relatively wide limits but not in general under 25% of the total.

What is claimed is:

1. A composition of matter for use as a thermoplastic cement and consisting of

| | Parts by weight |
|---|---|
| Methyl acetate | 38 to 50 |
| Vinyl acetate polymer, hydrolyzed to 12%–18% acetate group content | 12 to 19 |
| Phenol-formaldehyde resin | 0.2 to 2.0 |
| Mica flour | 25 to 45 |

2. A composition of matter for use as a thermoplastic cement and consisting of

| | Parts by weight |
|---|---|
| Methyl acetate | 42 to 44 |
| Vinyl acetate polymer, hydrolyzed to 13%–15% acetate group content | 16 to 18 |
| Phenol-formaldehyde resin | 1.0 to 1.4 |
| Mica flour | 25 to 45 |

3. A composition of matter for use as a thermoplastic cement and consisting of

| | Parts by weight |
|---|---|
| Methyl acetate | About 43 |
| Vinyl acetate polymer, hydrolyzed to about 14% acetate group content | About 16.8 |
| Phenol-formaldehyde resin | About 1.2 |
| Mica flour | About 39 |

GEORGE F. DUSTIN.
ROBERT B. MANNING.

REFERENCES CITED

The following references are of record in the file of this patent:

UNITED STATES PATENTS

| Number | Name | Date |
|---|---|---|
| 2,195,254 | Miller | Mar. 26, 1940 |
| 2,392,574 | Brown | Jan. 8, 1946 |